US012152460B2

(12) United States Patent
Mehta et al.

(10) Patent No.: US 12,152,460 B2
(45) Date of Patent: Nov. 26, 2024

(54) SAFETY BARRIER CONDULET FOR WELLHEAD INSTALLATION

(71) Applicant: TALLY USA, LLC, Houston, TX (US)

(72) Inventors: Neil Rasik Mehta, Jamaica Plain, MA (US); Wayne S Hill, Westborough, MA (US)

(73) Assignee: Tally USA, LLC, Houston, TX (US)

( * ) Notice: Subject to any disclaimer, the term of this patent is extended or adjusted under 35 U.S.C. 154(b) by 0 days.

(21) Appl. No.: 17/021,578

(22) Filed: Sep. 15, 2020

(65) Prior Publication Data

US 2022/0081988 A1   Mar. 17, 2022

(51) Int. Cl.
| E21B 33/068 | (2006.01) |
| E21B 33/038 | (2006.01) |
| E21B 41/00 | (2006.01) |
| E21B 47/017 | (2012.01) |
| F16J 15/08 | (2006.01) |

(52) U.S. Cl.
CPC ........ *E21B 33/068* (2013.01); *E21B 41/0021* (2013.01); *F16J 15/0818* (2013.01); *E21B 33/038* (2013.01); *E21B 47/017* (2020.05)

(58) Field of Classification Search
CPC .. E21B 33/068; E21B 33/038; E21B 41/0021; E21B 47/017; F16J 15/0818
See application file for complete search history.

(56) References Cited

U.S. PATENT DOCUMENTS

| 2,744,202 A * | 5/1956 | Horvath | H02K 5/04 310/71 |
| 4,535,851 A * | 8/1985 | Kirkpatrick | E21B 21/08 175/218 |
| 4,765,435 A * | 8/1988 | Reichert | G01V 11/002 254/323 |
| 4,860,151 A * | 8/1989 | Hutcheon | H02H 9/008 361/11 |
| 4,980,516 A * | 12/1990 | Nakagawa | H05K 9/0015 174/358 |
| 5,576,703 A * | 11/1996 | MacLeod | E21B 47/13 340/854.6 |
| 6,580,029 B1 * | 6/2003 | Bing | H02G 3/0608 174/24 |
| 2004/0046722 A1 * | 3/2004 | Trimble | G01D 11/24 345/87 |
| 2009/0289038 A1 * | 11/2009 | Ronhovd | H01H 9/04 218/158 |
| 2010/0193198 A1 * | 8/2010 | Murray | E21B 19/165 166/380 |
| 2013/0146491 A1 * | 6/2013 | Ghali | G06F 1/1626 53/472 |
| 2016/0265697 A1 * | 9/2016 | Tovar Murcia | E21B 33/02 |
| 2016/0306001 A1 * | 10/2016 | Taylor | G01R 31/58 |
| 2018/0375324 A1 * | 12/2018 | Wickett | H02H 9/00 |
| 2020/0248517 A1 * | 8/2020 | Bouldin | E21B 17/028 |
| 2020/0350749 A1 * | 11/2020 | Platt | F16L 13/161 |

FOREIGN PATENT DOCUMENTS

WO   WO-2014153657 A1 * 10/2014 ........... E21B 47/122

* cited by examiner

*Primary Examiner* — Christopher J Sebesta
*Assistant Examiner* — Yanick A Akaragwe
(74) *Attorney, Agent, or Firm* — Park, Vaughan, Fleming & Dowler LLP

(57) ABSTRACT

Wellbore equipment that are used in a wellhead electrical connection that prevents inadvertent safety consequences of explosion or fire by providing a condulet with safety barriers.

5 Claims, 6 Drawing Sheets

SAFETY BARRIER CONDULET FOR WELLHEAD INSTALLATION

CROSS-REFERENCE TO RELATED APPLICATIONS

None.

FIELD OF THE DISCLOSURE

Aspects of the disclosure relate to safety devices. More specifically, aspects of the disclosure relate to safety devices for wellhead installation.

BACKGROUND

Safety of workers and equipment is an important function in industry. Different types of industries require different types of safety equipment. As will be apparent, some types of industries require greater safety precautions than others as the environments encountered can be unique and potentially more dangerous. One such industry that must take special precautions regarding worker and equipment safety is the petroleum industry.

The petroleum industry seeks to recover trapped hydrocarbon reserves from underneath the surface of the ground and refine these hydrocarbons into usable products. The amounts of energy stored in such hydrocarbons can be vast. If the hydrocarbons are improperly handled, the vast amounts of energy may be released, negatively impacting people, equipment and the environment.

To prevent such energy release, safety precautions and safety equipment are used in different capacities. As can be understood, barriers are established that prevent open or exposed electrical equipment to explosive gas atmospheres to ensure worker safety. In conventional applications, processing of data is performed by an integrated circuit, application specific integrated circuit ("ASIC") or other logical device that is stored in a cabinet. The boundary of the cabinet is determined to be a "safety barrier" and great precautions are made to ensure the integrity of the safety barrier. As such, the more equipment that is stored within the confines of the cabinet to prevent equipment from being in contact with a potentially dangerous environment, the larger the cabinet becomes. Live electrical leads and wires, for example, must be kept away from other safety significant components. If a wire were to become detached, such a failure should not impact the safe operation of equipment or people. For example, a 50 millimeter spacing must be kept between sensor electrical connections and other electrical connections such that arcing is prevented. As spacing can be at a premium in cabinets, one alternative for operators having spacing issues is to ignore the spacing requirements within cabinets. Such actions may have very detrimental effects on people and equipment.

There is a need to provide apparatus and methods that are easier to operate than conventional apparatus and methods wherein safety is maintained for people and equipment in hydrocarbon recovery operations.

There is a further need to provide apparatus and methods that do not have the drawbacks discussed above, such as crowded cabinets and potentially detrimental equipment arrangements.

There is a still further need to reduce economic costs associated with hydrocarbon recovery operations and apparatus described above with conventional tools and apparatus.

SUMMARY

So that the manner in which the above recited features of the present disclosure can be understood in detail, a more particular description of the disclosure, briefly summarized below, may be had by reference to embodiments, some of which are illustrated in the drawings. It is to be noted that the drawings illustrate only typical embodiments of this disclosure and are therefore not to be considered limiting of its scope, for the disclosure may admit to other equally effective embodiments without specific recitation. Accordingly, the following summary provides just a few aspects of the description and should not be used to limit the described embodiments to a single concept.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the drawings. It is to be noted, however, that the appended drawings illustrate only typical embodiments of this disclosure and are therefore not to be considered limiting of its scope, for the disclosure may admit to other equally effective embodiments.

Figure 1:
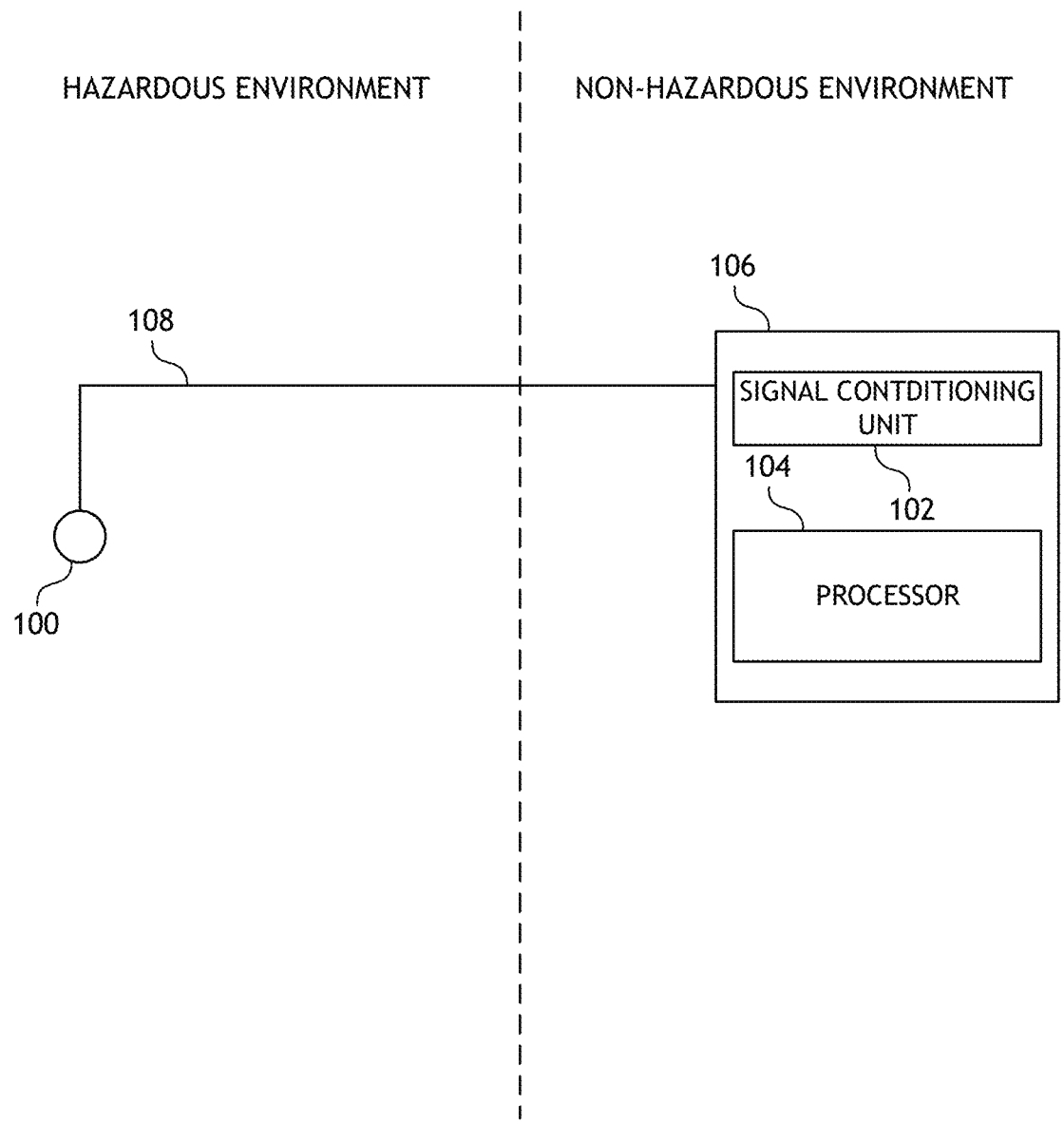
FIG. 1 is a plan diagram of a conventional safety apparatus cabinet used in hydrocarbon recovery operations.

To facilitate understanding, identical reference numerals have been used, where possible, to designate identical elements that are common to the figures ("FIGS"). It is contemplated that elements disclosed in one embodiment may be beneficially utilized in other embodiments without specific recitation.

DETAILED DESCRIPTION

In the following, reference is made to embodiments of the disclosure. It should be understood, however, that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the claims except where explicitly recited in a claim. Likewise, reference to "the disclosure" shall not be construed as a generalization of inventive subject matter disclosed herein and shall not be considered to be an element or limitation of the claims except where explicitly recited in a claim.

Although the terms first, second, third, etc., may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first", "second" and other numerical terms, when used herein, do not imply a sequence or order unless clearly indicated by the context. Thus, a first element, component, region, layer or section discussed herein could be termed a second element, component, region, layer or section without departing from the teachings of the example embodiments.

When an element or layer is referred to as being "on," "engaged to," "connected to," or "coupled to" another element or layer, it may be directly on, engaged, connected, coupled to the other element or layer, or interleaving elements or layers may be present. In contrast, when an element is referred to as being "directly on," "directly engaged to," "directly connected to," or "directly coupled to" another element or layer, there may be no interleaving elements or layers present. Other words used to describe the relationship between elements should be interpreted in a like fashion. As used herein, the term "and/or" includes any and all combinations of one or more of the associated listed terms.

Some embodiments will now be described with reference to the figures. Like elements in the various figures will be referenced with like numbers for consistency. In the following description, numerous details are set forth to provide an understanding of various embodiments and/or features. It will be understood, however, by those skilled in the art, that some embodiments may be practiced without many of these details, and that numerous variations or modifications from the described embodiments are possible. As used herein, the terms "above" and "below", "up" and "down", "upper" and "lower", "upwardly" and "downwardly", and other like terms indicating relative positions above or below a given point are used in this description to more clearly describe certain features.

Referring to FIG. 1, a conventional or "prior art" apparatus is disclosed. In this plan depiction, the environment is broken into two portions, a hazardous environment and a non-hazardous environment. A hazardous environment is defined wherein the environment is prone to explosion or fire due to the potential for hydrocarbons being present. A non-hazardous environment is defined as an environment that is not prone to explosion or fire. In conventional apparatus, a sensor 100 is placed within the hazardous environment. Wiring 108 may pass from the sensor 100 to a safety enclosure 106 located within a second environment. The second environment may be a hazardous environment or a non-hazardous environment. As the second environment may be a hazardous environment, precautions are made regarding the safety enclosure 106 such that potential failures in the enclosure 106 will not have significant safety implications. Signal conditioning apparatus 102 are located within the safety enclosure 106 as well as processing equipment 104. As can be seen, the need for more processing capability or signal conditioning necessitates an increased size for the safety enclosure 106. To that end, the safety enclosure 106 requires compliance certification to not only the exterior of the safety enclosure 106, but of the materials and arrangements inside the safety enclosure 106. As time progresses, larger and larger safety enclosures 106 are needed, increasing the overall costs of providing the necessary protection. These conventional safety enclosures 106 provide for safe operation by using an expensive diode-based safety barrier for the electrical components inside. These expensive diode-based safety barriers can be fragile and must be developed for each application of use. Such customization leads to high cost and reduced space within the safety enclosure 106.

Figure 2:
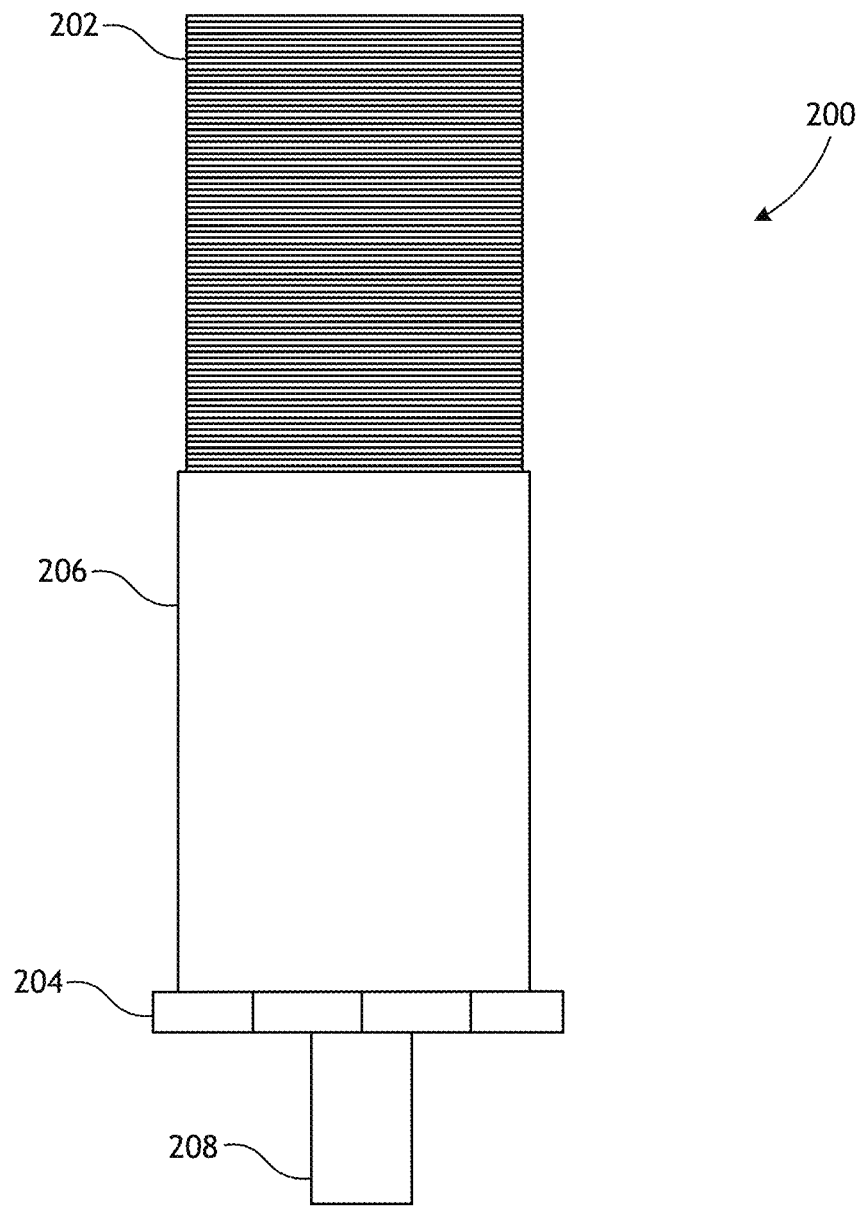
FIG. 2 is a cross-section of a dynamic pressure sensor used in one example embodiment of the disclosure.

Referring to FIG. 2, a dynamic pressure sensor 200 is illustrated. The dynamic pressure sensor 200 may be used to sense pressures from various portions of a hazardous environment in a hydrocarbon recovery operation or a hazardous zone that requires certification of equipment to prevent explosion or fire. In this illustrated embodiment, the dynamic pressure sensor 200 is a unit that has a two-pin connector. The dynamic pressure sensor 200 may be installed in a number of areas in a hydrocarbon recovery operation or in an environment where pressure readings are required. The dynamic pressure sensor 200 is configured with a first end 202 and a second end 208. The dynamic pressure sensor 200 has a body 206 that allows the screw threads of the first end 202 to engage in a female receptacle where pressure is to be monitored. Tightening of the body 206 to the female receptacle may be accomplished through an outside diameter 204 that is configured, in this non-limiting embodiment, with a surface that can be engaged by a ratchet or wrench. An electrical connection may be made by placing a wire through the opening at the second end 208. The second end 208 may be a self-sealing end wherein only the cable is allowed to penetrate the sealing portion, thereby insulating the internals of the dynamic pressure sensor 200 from the outside environment. The threads at the first end 202 may be any type of thread to mate with a female end connection. In other embodiments, threads may be eliminated as long as a sealing between the first end 202 and the female connection is established and maintained.

Aspects of the disclosure provide several advantages over conventional apparatus. In embodiments, readings from the dynamic pressure sensor 200 may be channeled to a condulet that performs functions outside of a typical safety enclosure 106. These functions may be conducted within a hazardous environment close to the sensors. One particular advantage is that the use of a condulet, for example, allows equipment to be removed from the safety enclosure 106. The equipment removed, such as signal processing equipment, may be located near the point of origin where signals are measured. Thus, the use of the condulet allows for superior clarity of the pressure readings as less cabling is required between the point at which the pressure readings are taken and the signal processing equipment stored within the condulet. Room within the safety enclosure 106 allows for a more fault tolerant system wherein detachment of wires within the safety enclosure 106 will not contact other critical pieces or components that may be safety sensitive. Moreover, reducing the footprint used within the safety enclosure 106 allows for more processors 104 to be installed within the safety enclosure 106 that will allow future communication capabilities to be enhanced.

Figure 3:
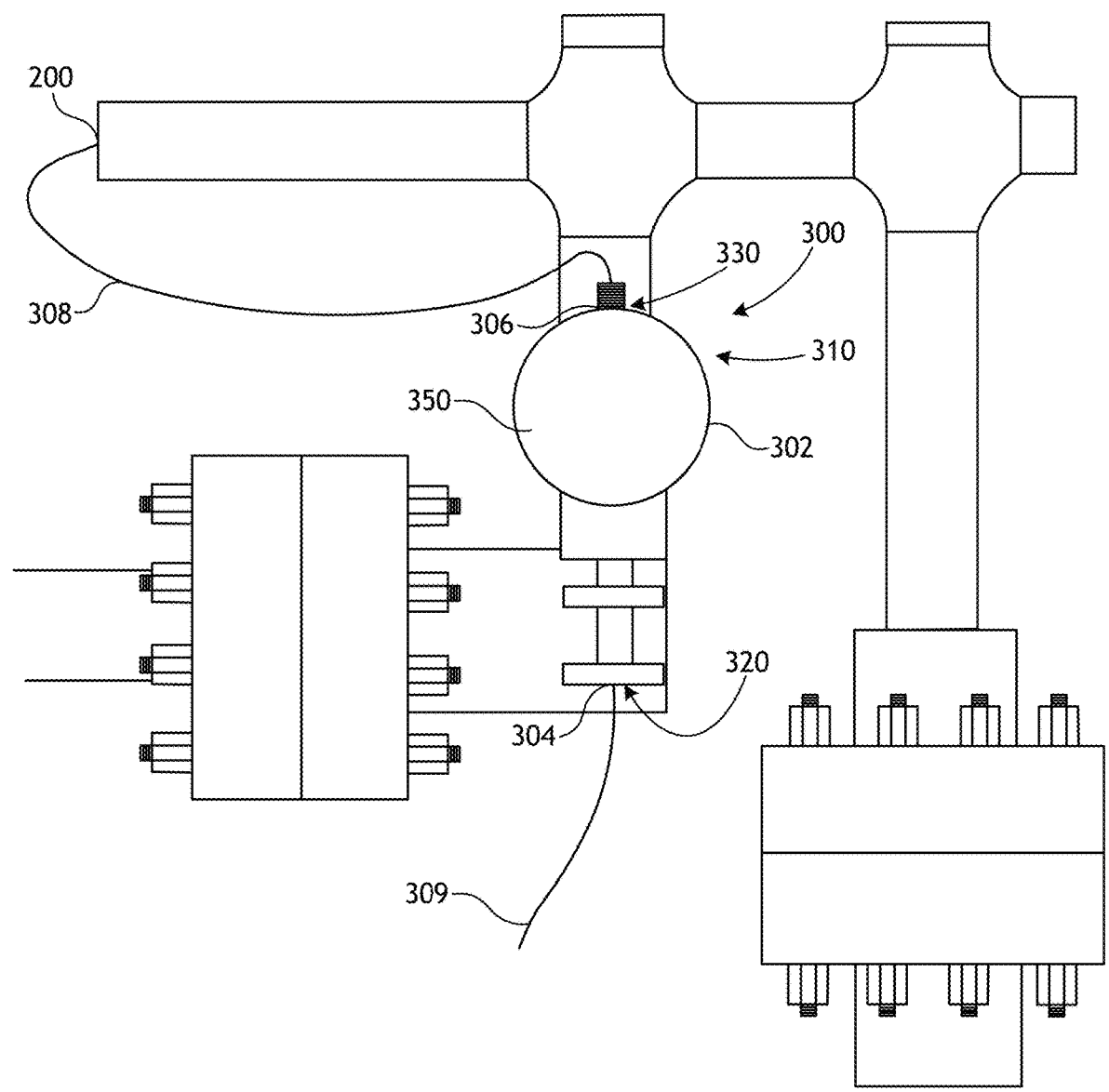
FIG. 3 is a plan view of a condulet used in a wellhead electrical connection in one example embodiment of the disclosure.

Referring to FIG. 3, a condulet 300 is illustrated. The condulet 300 is configured with a body 302 that has a first end 304 and a second end 306. The first end 304 allows for the penetration of wires 309 to the internal volume 310 of the body 302. The size of internal volume 310 is dependent upon the amount of electronics to be placed within the internal volume 310. At the condulet second end 306, wires 308 may penetrate into the internal volume 310. The wires 308 are configured to send data from a pressure sensor 200, as described in FIG. 2, to the body 302 of the condulet 300.

The body 302 is configured to accept the data from the pressure sensor 200 and perform necessary processing to other computer equipment. Within the first end 304 and the second end 306, a compression packing material may be placed to establish the amount of separation between the environment outside the condulet 300 and the internal volume 310.

At the first end 304, a first sealing arrangement 320 is located. The first sealing arrangement 320 is configured to prevent the outside environment from encroaching into the internal volume 310 of the body 302. At the second end 306, a second sealing arrangement 330 is provided. The second sealing arrangement 330 is also configured to prevent the outside environment from encroaching into the internal volume 310 of the body 302. In embodiments, the internal volume 310 may have a layer of insulation, providing thermal protection for internal condulet 300 components.

The first sealing arrangement 320 and the second sealing arrangement 330 are both configured to withstand environmental conditions, such as repeated shock and vibration that are common on drill rigs and hydrocarbon processing facilities. The first sealing arrangement 320 and the second sealing arrangement 330 are not chemically reactive to hydrocarbons or atmospheres that contain hydrocarbons.

Each of the first sealing arrangement 320 and the second sealing arrangement 330 are configured to be removed from the body 302 of the condulet 300. The ability to be removed allows the condulet 300 to be adapted for the type of service that will be seen. Field personnel may swap or change a first sealing arrangement 320 or second sealing arrangement 330 for different sealing arrangements with different qualifications, if necessary. Such qualifications could be for higher pressure environments, higher shock loading capability, higher or lower temperature, different chemical atmospheres and more insulative capabilities as non-limiting alternatives.

Each condulet 300 may also have a faceplate 350 that may be detached from the remainder of the body 302. The faceplate 350, together with the body 302 may form a seal for the internal volume 310 of the condulet 300. In the illustrated embodiment, the faceplate 350 may be a stainless steel unit that mechanically fastens onto the body 302. In embodiments, metallic materials may be used. In non-limiting embodiments, aluminum, steel or cast iron may be used. The mechanical fastening may be a screw connection, a bolted connection or other similar type connection. Although illustrated as a solid unit, the condulet 300 may be provided with a view window that allows operators to visually check operations inside the condulet 300 to ensure that wiring is not loose. Such a configuration would allow for in-field diagnosis of problems where data is not being received at the safety enclosure.

Although described as being compliant with hydrocarbon recovery operations, other configurations are possible. For example, aspects of the disclosure may be qualified for other types of hazardous environments. These hazardous environments may include the presence of flammable vapors, liquids or gases other than that from hydrocarbons, or combustible dusts or fibers that may be present therein and the likelihood that a flammable or combustible concentration or quantity is present. Hazardous (classified) locations may be found in occupancies such as, but not limited to, the following: aircraft hangars, gasoline dispensing and service stations, textile production, storage facilities, bulk storage plants for gasoline or other volatile flammable liquids, paint-finishing process plants, health care facilities, agricultural or other facilities where excessive combustible dusts may be present, marinas, boat yards, and petroleum and chemical processing plants.

As classified by North American standards, the condulet 300 may be compliant with combustible gas (Class I), combustible dust (Class II), or fibers (Class III). Alternatively and/or additionally, different divisions may be allocated to sub-species (divisions) of these classes. Other qualification standards may also be attained by the condulet 300. These standards may include international electrotechnical commission (IEC) standards. Temperature standards for surface contacts may also be governed. In one example embodiment, surface contact standards may have the condulet 300 graded from temperatures from 15 degrees C. to exceeding 450 degrees C.

The condulet 300 may also be protected from solid material entry, such as dust or fiber entry such as under Internation Protection Standard IEC 60529. Moreover, the condulet 300 may also be protected from liquid entry according to the type of liquid exposure anticipated. Such exposures may include protection against vertical droplets, protection against liquids spraying on the condulet 300, protection against jets of liquid, temporary drops or emersions in liquid or full emersion.

The first end 304 and the second end 306 of body 302 of the condulet 300 may be provided with cable glands. A cable gland is a device designed to attach and secure the end of an electrical cable to the equipment. The cable glands provide strain-relief for the cable and the environment to be encountered.

The condulet body 302 and faceplate 350 may be made of rugged material intended for the intended environment. Non-limiting examples of rugged material include stainless steel, aluminum, carbon steel, cast iron and plastic. In each of the types of condulet bodies 302, signal conditioning apparatus may be placed with the volume 310 such that signals generated by the pressure sensor 200 are processed for transfer. This processing may include filtering and amplification where necessary. Signal filtering may be performed by a separate signal filter arrangement that occurs upon entry of the data from the pressure sensor 200 into the condulet body 302. After noise is filtered out from the incoming signal, amplification may occur in an amplification arrangement. As will be understood, amplification may be an optional function performed within the condulet body 302. Data may be transferred to the second end 306, through various strategies, including optical and galvanic connections, as disclosed. The signal filter arrangement may remove unwanted components or features from the signal being transferred. In the case of a pressure signal, errant signals may be generated by running machinery on the drill rig. In the event of running machinery that corrupts the signal generated by the pressure sensor 200, a complete or partial suppression of some aspect of the signal received may be accomplished. In embodiments, this means removing some frequencies or frequency bands. As the signal generated by the pressure sensor 200 could be an analog or a digital signal, embodiments disclosed can use either analog or digital filters. The filtering may occur in real time or may be time delayed.

Some instances may include the establishment of a connection to the condulet 300 wherein multiple sensors in different positions are required to be monitored. In continuous operations, large amounts of data may be generated by the sensors, where sampling time is extremely short. Multiplication of this large amount of data per sensor by numerous sensor placement may be handled by compression algorithms sending the data from the condulet 300 to processors in the body 302 for further processing. As will be understood, different numbers of pressure sensors may be used, and therefore the condulet 300 may have additional openings for entry of data lines from each of the pressure sensors. In embodiments, the condulet 300 may have four entry points where wiring from pressure sensors enter the condulet 300. Each of these entry points may be individually controlled, wherein each data cable has a discrete entry point. Thus, a condulet 300 may have two pressure sensors connected to the condulet 300, but there may be four discrete entry points. In this instance, two blanks may be installed in two of the entry points.

The condulet 300 provides great flexibility compared to conventional apparatus. The condulet 300 may allow quick attachment of additional pressure sensors being installed through different entry points with a single cable exiting the first end 304 going to the processor. Conventional apparatus would require large amounts of cabling to be carried across the rig floor to the safety enclosure, thereby increasing the amount of exposed cabling in the work environment. By providing a condulet 300 with signal processing capabilities in a hazardous environment, risks of accident are greatly diminished.

Figure 5:
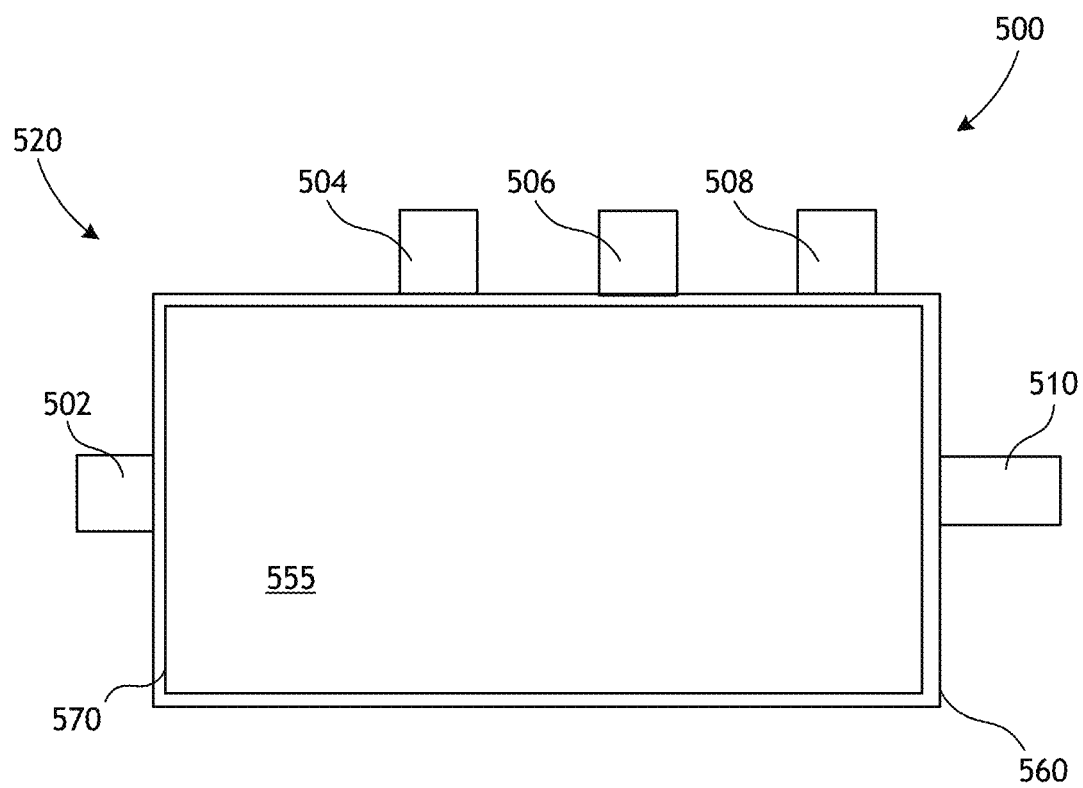
FIG. 5 is a condulet arrangement with multiple entry points, in another example embodiment of the disclosure.
Figure 6:
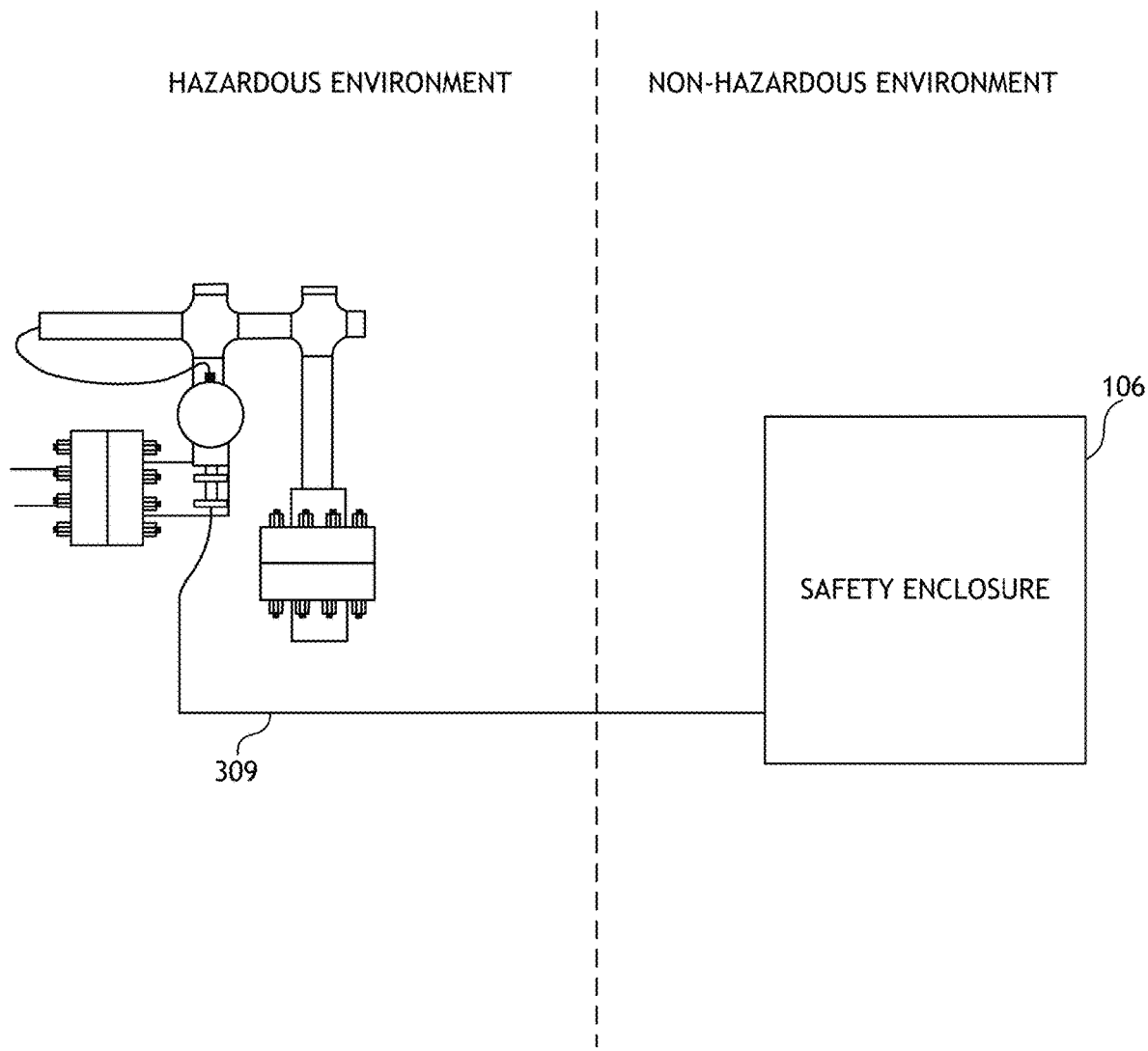
FIG. 6 is a plan view of one example embodiment of the disclosure showing a condulet located in a hazardous environment coupled to a safety enclosure located in a non-hazardous environment.

Referring to FIG. 5, a condulet 500 with multiple entry points is disclosed. In the illustrated embodiment, four entry points, at first end 502, and three additional entry points 504, 506, 508 are provided. The second end 510 provides the connection point that sends data to the enclosure for further processing. Other configurations are possible, wherein the condulet 500 has two, three or more entry points. For installation, field personnel may merely use a condulet 500 that has more entry points than are needed as originally planned. By choosing a condulet 500 with extra entry points, alterations may be accomplished by field personnel quickly, by removing a blanked entry point for quick connection of the wiring.

Transfer of data within the condulet 500 from the pressure sensor 200 to the points 502, 504, 506, 508 may be accomplished by different electrical components placed within the volume 520 of the body 560. One such transfer capable connection may be an opto-isolator, opto coupler, photocoupler or optical isolator that allows transfer of electrical signals between two isolated circuits by using light. The use of an opto-isolator can prevent high voltage from being generated, thereby causing a spark sufficient to ignite a combustible atmosphere.

In other embodiments, electrical arrangements used within the condulet 500 may include circuits that provide galvanic isolation. Current flow is prevented between two isolated electrical systems as no direct conduction path is permitted. Energy or data may be exchanged from the first end 502 of the condulet 500 to the second end 510 of the condulet 500 through capacitance, induction or electromagnetic waves. Other embodiments may also be used, including optical or acoustical arrangements.

A gasket 570 may be installed between a faceplate 555 and the body 560 of the condulet 500. The gasket 570 may allow the faceplate 555 to be securely fastened to the body 560 without intrusion into the inner volume 520. In embodiments, the gasket 570 may be an elastomeric gasket, a metallic gasket, a graphite gasket, a polytetrafluoroethylene ("PTFE") gasket or a compressed non-asbestos fiber gasket. A gasket may be used in all of the embodiments described.

Figure 4:
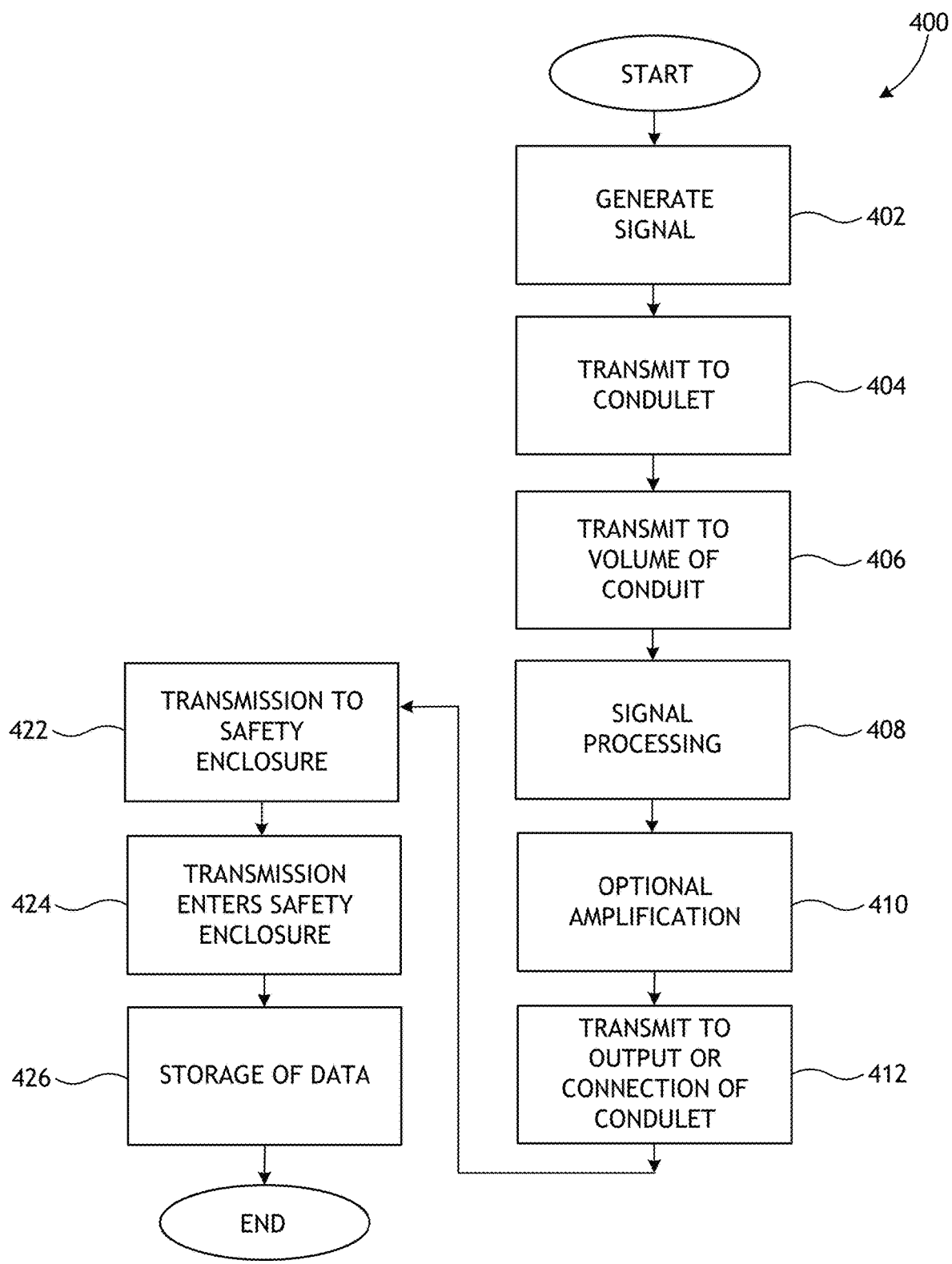
FIG. 4 is a method of safety operations in one example embodiment of the disclosure.

Referring to FIG. 4, a method 400 of processing a signal in a hazardous environment is disclosed. A signal is generated, at 402. The signal is transmitted down a wire to a condulet located in a hazardous environment at 404. At 406, the signal is transferred into a volume of a body of the condulet such that the volume of the body of the condulet is separated from an external environment. At 408, a signal processing occurs within the condulet to produce a processed signal. At 410, an optional amplification of the signal occurs. At 412 the processed signal is transmitted to a connection for transmission out of the condulet. The transmission of the processed signal may be through an optical, galvanic or other transmission. At 422, the processed signal is transmitted out of the condulet to a safety enclosure. The processed signal, at 424, may enter the safety enclosure for processing by a processing arrangement. The further processing may entail further transmission of data to a point remote from the enclosure, through a wire or wireless transmission. At 426, the signal may also be optionally stored in a memory arrangement configured to store data. The memory arrangement may be a non-volatile memory arrangement such as NVRAM, a disk drive, a universal serial bus memory arrangement or computer chips.

The reduction of components within the safety enclosure 106 allows safety enclosure to be qualified more easily by standardization organizations. The use of a condulet will maintain the safety of the intrinsically safe circuit that is developed for the specific application use. In the embodiments described, the expensive diode safety barrier is eliminated, saving costs for installation. The aspects of the disclosure also allow for different form factors for instrument hardware. These form factors may be more attractive than conventional units as the sizes may be reduced and require less wiring for installation. In embodiments, any diode safety barrier used may be placed inside the condulet to ensure the sensor circuit is protected from high energy sources. Such a configuration provides for a strict geometric profile for the safety enclosure 106. Such a configuration allows for local location of the safety diode in a safe location, ultimately freeing valuable space within power cabinets exterior to the safety condulet 106.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may be varied in many ways. Such variations are not to be regarded as a departure from the disclosure, and all such modifications are intended to be included within the scope of the disclosure.

While embodiments have been described herein, those skilled in the art, having benefit of this disclosure, will appreciate that other embodiments are envisioned that do not depart from the inventive scope. Accordingly, the scope of the present claims or any subsequent claims shall not be unduly limited by the description of the embodiments described herein.

What is claimed is:

1. A system for housing electronic components in a hazardous environment and a non-hazardous environment, where the hazardous environment includes airborne hydrocarbons and the non-hazardous environment is substantially free of airborne hydrocarbons, the system comprising:

a condulet located in the hazardous environment proximate a wellhead and a pressure sensor measuring signals in the hazardous environment, wherein the condulet encloses a volume and provides a barrier against the airborne hydrocarbons in the hazardous environment from entering the volume;

the condulet further including at least a first end for access to the volume and at least a second end for access to the volume;

the first end of the condulet including a first removable sealing arrangement that seals against the airborne hydrocarbons in the hazardous environment from encroaching into the volume, and the second end of the condulet including a second removable sealing arrangement that seals against the airborne hydrocarbons in the hazardous environment from encroaching into the volume;

a signal conditioning circuit mounted in the volume for receiving signals from the pressure sensor through the first end of the condulet, wherein the signal conditioning circuit includes a diode safety barrier, and wherein the signal conditioning circuit filters and amplifies the signals received from the pressure sensor;

a signal processing circuit mounted in the volume for receiving and processing the filtered and amplified signals from the signal conditioning circuit;

an output for transmitting the processed signals from the signal processing circuit to the second end of the condulet; and a safety enclosure located in the non-hazardous environment, wherein the safety enclosure includes electronic circuitry coupled to receive the processed signals transmitted to the second end of the condulet.

2. The system of claim 1 wherein the hazardous environment is one that requires certification of equipment to prevent at least explosion or fire.

3. The system of claim 1 wherein the condulet is compliant with North American standards, including combustible gas (Class I), combustible dust (Class II), or fibers (Class III).

4. The system of claim 1 wherein the condulet is compliant with International Protection Standard IEC 60529.

5. The system of claim 1 wherein the signal processing circuit receives signals from the signal conditioning circuit via an opto-isolator, opto coupler, photocoupler, optical isolator, capacitance, or induction.

* * * * *